(12) United States Patent
Miyashita (10) Patent No.: US 6,628,350 B1
(45) Date of Patent: Sep. 30, 2003

(54) LIQUID CRYSTAL DISPLAY DEVICE AND METHOD OF PRODUCING THE SAME

(75) Inventor: Hiroshi Miyashita, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/650,190

(22) Filed: Aug. 29, 2000

(30) Foreign Application Priority Data

Aug. 30, 1999 (JP) .......................................... 11-243057

(51) Int. Cl.⁷ .......................................... G02F 1/1333
(52) U.S. Cl. .......................................... 349/52; 349/43
(58) Field of Search .......................... 349/43, 106, 78, 349/114, 52

(56) References Cited

U.S. PATENT DOCUMENTS

| 6,118,505 A | * | 9/2000 | Nagata et al. | 349/106 |
| 6,121,632 A | * | 9/2000 | Taguchi et al. | 257/57 |
| 6,203,951 B1 | * | 3/2001 | Furukawa et al. | 430/7 |
| 6,309,917 B1 | * | 10/2001 | Furuta et al. | 438/149 |
| 6,310,672 B1 | * | 10/2001 | Koike et al. | 349/106 |
| 6,466,281 B1 | * | 10/2002 | Huang et al. | 349/44 |

FOREIGN PATENT DOCUMENTS

| EP | 0 708 355 | 4/1996 |
| JP | 4-324820 | 11/1992 |
| JP | 4-338718 | 11/1992 |
| JP | 05-232507 | 9/1993 |
| JP | 5-341321 | 12/1993 |
| JP | 08-122768 | 5/1996 |

* cited by examiner

Primary Examiner—Robert H. Kim
Assistant Examiner—H. Nguyen
(74) Attorney, Agent, or Firm—Nixon & Vanderhye, P.C.

(57) ABSTRACT

In an active matrix type display device, an insulating film pattern is formed between scanning lines and/or between signal lines. An upper insulating film is formed on the insulating film pattern and the lines and in spaces between the insulating film patterns and the lines so that the upper insulating film has a continuous top surface at a substantially same level. For further improvement in flatness and adjustment in film thickness of the upper insulating film, the whole surface of the upper insulating film is etched back. After that, pixel electrodes are formed on the upper insulating film.

8 Claims, 8 Drawing Sheets

LIQUID CRYSTAL DISPLAY DEVICE AND METHOD OF PRODUCING THE SAME

BACKGROUND OF THE INVENTION

The present invention relates to an active matrix type liquid crystal display device and a method of producing the same. More particularly, the present invention relates to a surface planarization technique for a drive substrate of such a liquid crystal display device in wiring regions in which conductive lines are formed and regions between the conductive lines.

Figure 8A:
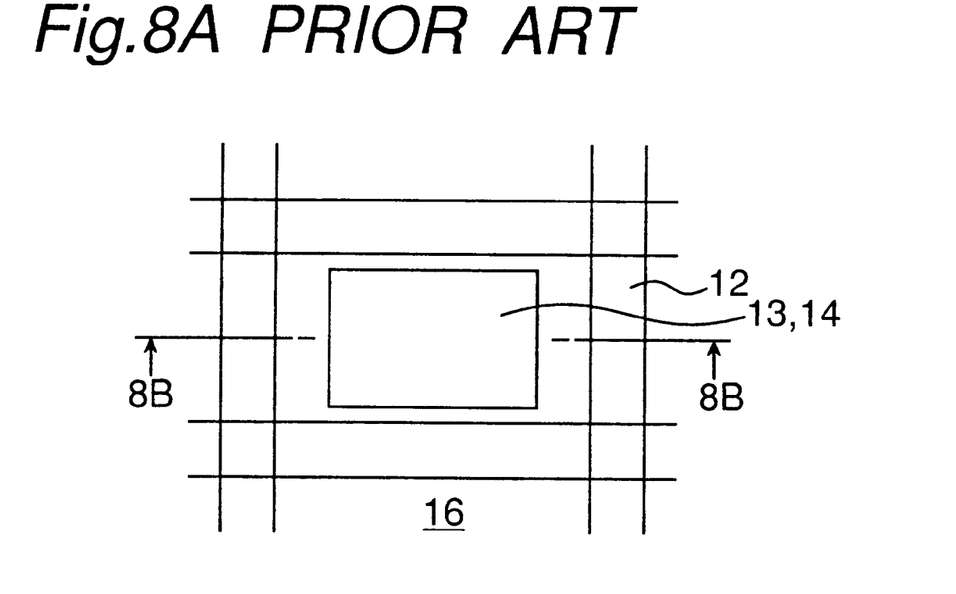
FIG. 8A is a simplified plan view of an essential part of a conventional liquid crystal display device.
Figure 8B:
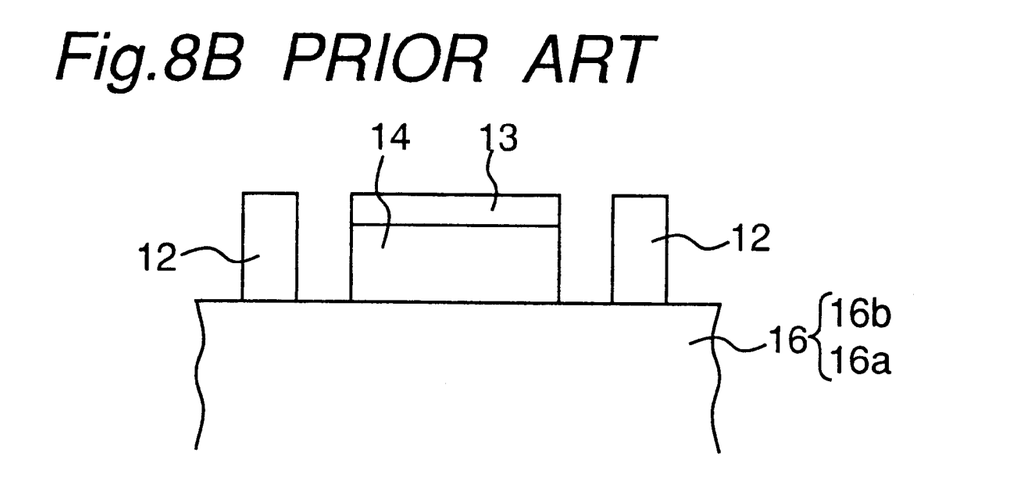
FIG. 8B is a cross-sectional view taken on line 8B—8B of FIG. 8A.
Figure 9A:
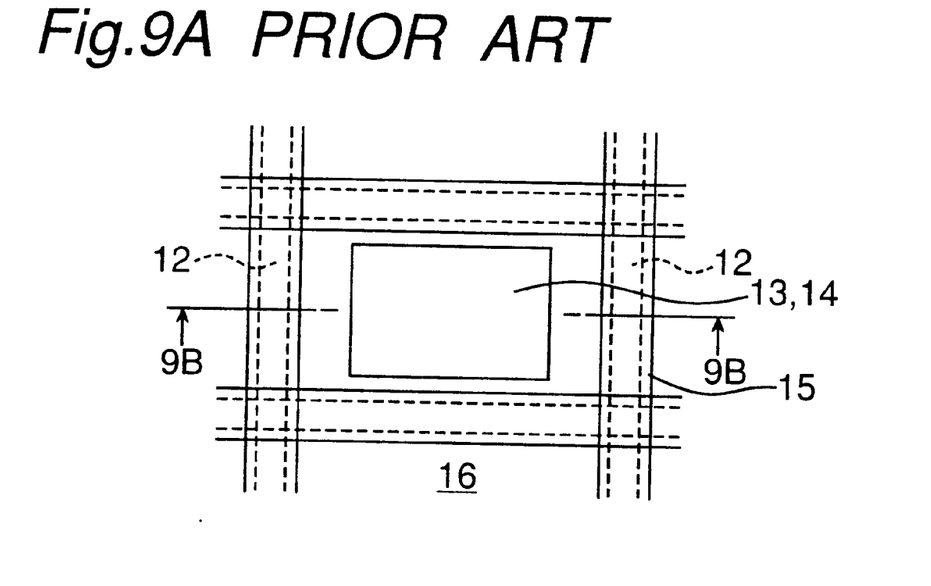
FIG. 9A is a simplified plan view of an essential part of a conventional liquid crystal display device.
Figure 9B:
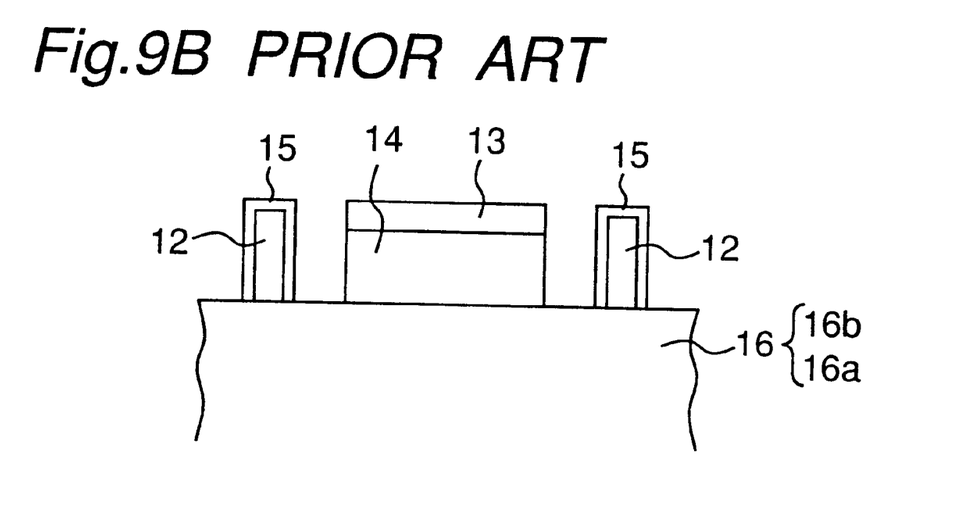
FIG. 9B is a cross-sectional view taken on line 9B—9B of FIG. 9A.

FIGS. 8A and 8B schematically show plan and sectional views, respectively, of a principal part of a drive substrate in a conventional active matrix type liquid crystal display device. FIGS. 9A and 9B schematically show plan and sectional views, respectively, of the principal part of the drive substrate in another conventional active matrix type liquid crystal display device. In these figures, same reference numbers are given to similar parts.

The structure of the conventional drive substrate shown in FIGS. 8A and 8B corresponds to that disclosed in JP-A-4-234820 (published in 1992). In these figures, reference numeral 12 designates a conductive line for wiring, reference numeral 13 designates a pixel electrode, reference numeral 14 designates an insulating film, and reference numeral 16 designates a substrate made up of an insulating film substrate 16a and under layers 16b formed on the insulating film substrate. This drive substrate is obtained by forming layers and patterns other than the conductive lines 12 and the pixel electrode 13 (i.e. the under layers 16b) on the insulating substrate 16a, then forming the insulating film 14, and then forming the pixel electrode 13 on the insulating film 14 as well as forming the lines 12. When the liquid crystal display device is a transmission type, it is required to use a transparent material for the insulating film 14 as well. Photosensitive transparent polyimide and the like are used, for example.

On the other hand, the structure of the conventional drive substrate shown in FIGS. 9A and 9B is formed according to the technique disclosed in JP-A-4-338718 (published in 1992). According to this prior art, in order to flush top surfaces of the lines 12 and the pixel electrode 13, namely, to make the levels of these parts identical, a transparent insulating film 14 is placed under the pixel electrode 13 to form a convex part.

Alternatively, the lines are etched beforehand to form concave parts. Next, the lines 12 are coated with an insulating material 15, whereby the level difference between the lines 12 and the transparent pixel electrode 13 is canceled. As the insulating material 15, for example, polyimide is used.

Figure 10:
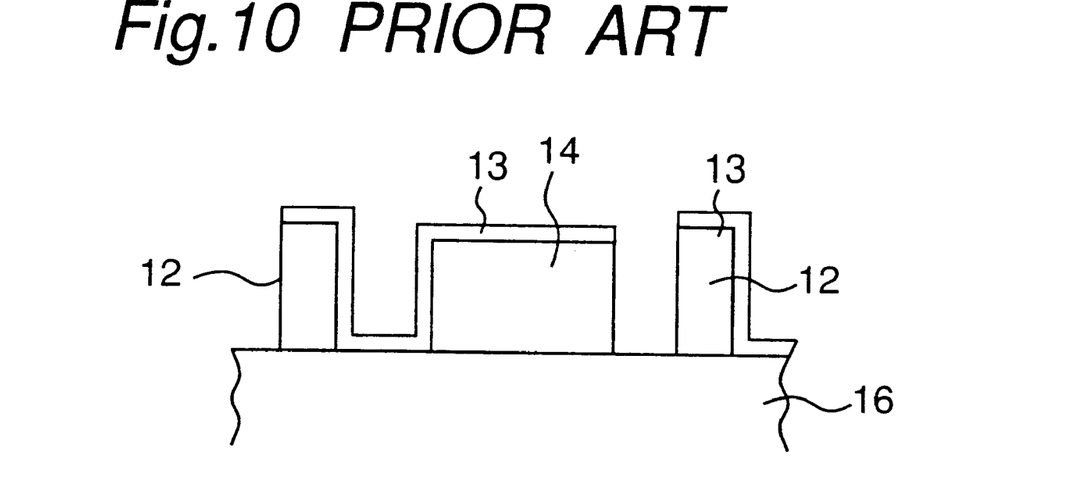
FIG. 10 is a schematic cross-sectional view of the conventional structure shown in FIG. 8 when modified so that a pixel electrode is formed even on the lines.
Figure 11:
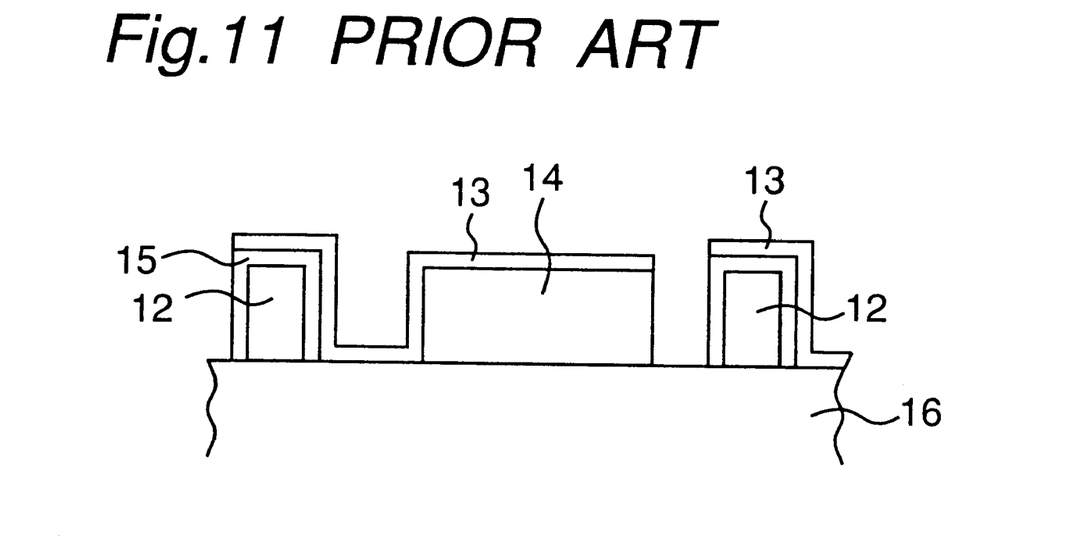
FIG. 11 is a schematic cross-sectional view of the conventional structure shown in FIG. 9 when modified so that a pixel electrode is formed even on the lines.

In the above two prior arts, the insulating film 14 is not associated with the lines 12 (FIGS. 8A and 8B) or the lines 12 coated with the insulating material 15 (FIGS. 9A and 9B) to form a surface that is continuous at the same level. Therefore, a region in which the pixel electrode 13 is formable is limited to an upper surface of the insulating film 14. In order to explain a reason why the region in which the pixel electrode 13 is formable is limited to an upper surface of the insulating film 14, FIGS. 10 and 11 show cases where the structures shown in FIGS. 8A and 8B and FIGS. 9A and 9B have been modified such that pixel electrode-forming region is expanded beyond the insulating film 14 onto the lines 12. In FIG. 10, the lines 12 are directly connected to the pixel electrodes 13, and thus, disadvantageously, the pixels are always electrically connected to the lines 12. Further, in both of the cases of FIGS. 10 and 11, uneven portions (concave portions) arise in the pixel electrodes 13 due to gaps between the lines and the insulating film. Therefore, in a rubbing step conducting an orientation treatment of the liquid crystal, the orientation treatment cannot be performed uniformly due to barriers attributed to the unevenness of the pixel electrodes, resulting in a deterioration of the degree of orientation at the concave portions, namely in the gaps. Because of the reason mentioned above, the pixel electrode 13 cannot be formed on regions other than the insulating film 14 in these prior arts. This leads to a reduction in the numerical aperture, which is inconvenient for the liquid crystal display device.

SUMMARY OF THE INVENTION

An object of the present invention is to provide an active matrix type liquid crystal display device in which a plurality of scanning lines and a plurality of signal lines are arrayed on an insulating substrate in such directions that the scanning lines intersect the signal lines, and in which pixel electrodes are flatly formed even on the scanning lines and/or the signal lines so that the numerical aperture can be improved, and also to provide a method of producing such a device.

In order to achieve the above object, there is provided a liquid crystal display device according to an aspect of the present invention in which a plurality of scanning lines and a plurality of signal lines are arrayed on an insulating substrate in such directions that the scanning lines and the signal lines intersect each other, comprising:

insulating film patterns each formed between the adjacent scanning lines and/or between the adjacent signal lines;

an upper insulating film formed on the insulating film patterns and the lines between which the respective insulating film patterns are formed, and in spaces between the insulating film patterns and the lines, said upper insulating film having a continuous top surface at a same or approximately same level; and pixel electrodes formed on the upper insulating film.

In this liquid crystal display device, since the upper insulating film, which is formed on the lines and between the lines, has a continuous top surface at the same or approximately same level, it is possible that the whole surface of the pixel electrode also has a same or approximately same level. That is, in all the regions on the lines and between the lines, a structure planarized at an identical level is obtained. Accordingly, it becomes possible to conduct uniform orientation treatment. Also, since the upper insulating film, which is formed on the lines and between the lines, has a continuous top surface at the same or substantially same level, it becomes possible to expand the pixel electrode-forming region towards above the lines without limiting it to between the lines. Therefore, the numerical aperture can be improved.

Further, according to another aspect of the invention, there is provided a method of producing a liquid crystal display device in which a plurality of scanning lines and a plurality of signal lines are arrayed on an insulating substrate in such directions that the scanning lines and the signal lines intersect each other, comprising:

forming an insulating film pattern between the adjacent scanning lines and/or the adjacent signal lines; and forming an upper insulating film on the insulating film patterns and the lines and in spaces between the insulating film patterns and the lines in such a manner that the upper insulating film has a continuous top surface at a same or approximately same level.

According to this method, the upper insulating film is formed on the lines and between the lines so as to have a continuous top surface at the same or approximately same level. Therefore, it becomes possible to expand the pixel electrode-forming region towards above the lines without limiting it to between the lines, and thus an improvement in the numerical aperture can be attained. Also, if the pixel electrode is formed on the upper insulating film, it is possible that the whole surface of the pixel electrode also has the same or approximately same level. Therefore, a structure planarized at an identical or approximately identical level in all the regions on the lines and between the lines is obtained. Accordingly it becomes possible to conduct uniform orientation treatment.

In order to ensure that the upper insulating film fills spaces between the insulating film patterns and the lines adjacent to the insulating film patterns, the upper insulating film may be preferably formed so as to have a film thickness that is at least ½ of the space between the insulating film patterns and the lines adjacent to the insulating film patterns. The upper insulating film formed to such a film thickness may be used as is, or it may be thinned by an etch-back method. By etching back the upper insulating film, the upper insulating film having a desired film thickness is obtained. Furthermore, the flatness is more improved.

When the present invention is applied to a transmission type liquid crystal display device, the upper insulating film pattern may be formed from a transparent film having a refractive index of 1.4–1.95.

Further, if a lower insulating film, which is made of a material different from materials of the insulating film patterns and the upper insulating film, is formed before forming the upper insulating film patterns, the lower insulating film serves as an etching stopper in the etching process for forming the insulating film patterns and in the etching process for the upper insulating film.

Other objects, features and advantages of the present invention will be obvious from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

First Embodiment

Figure 1:
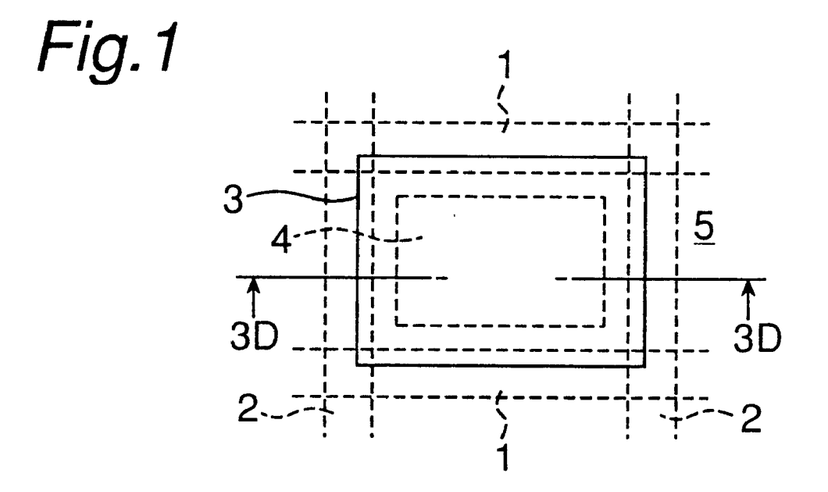
FIG. 1 is a simplified plan view of an essential part of a liquid crystal display device according to one embodiment of the present invention.

FIG. 1 is a simplified plan view of a drive substrate (only a portion of one pixel is shown) partially constituting a transmission type active matrix liquid crystal display device, which is a first embodiment of the present invention. FIGS. 3A–3D schematically show process steps of production of the drive substrate in FIG. 1. The present invention is characterized in that a pixel electrode-forming region is expanded by the planarization of regions in which wiring lines are formed and regions between those lines. In these figures, only those parts that are related to the invention are shown and thus those parts that are not directly related to the invention, such as liquid crystals, an orientation film, and a switching element, are omitted in order to make the figures simple.

As shown in FIG. 1, a number of scanning lines (only two of the lines adjacent to each other are shown) 1 extend parallel with one another in a row direction. Above the scanning lines, a number of signal lines parallel with one another (only two of the lines adjacent to each other are shown) 2 extend in a column direction approximately orthogonal to the scanning lines. A thin film transistor (TFT), which is not shown in the figure, is formed as a switching element in the vicinity of an intersection of each scanning line 1 and each signal line 2. A gate electrode and a source electrode of the TFT are connected to the scanning line 1 and the signal line 2 respectively. Further, a drain electrode of the TFT is connected to an approximately rectangular pixel electrode 3. Approximately rectangular insulating film patterns 4 are individually formed between the adjacent scanning lines 1 and between the adjacent signal lines 2. An upper insulating film 5, which functions as a planarizing film, is formed on the scanning lines 1 and the insulating film patterns 4 and in spaces between the scanning lines 1 and the insulating film patterns 4 adjacent to the scanning lines 1. Similarly, another upper insulating film 5 is formed on the signal lines 2 and the insulating film patterns 4 and in spaces between the signal lines 2 and the insulating film patterns 4 adjacent to the signal lines 2. On the upper insulating film 5 formed on the signal lines 2, the pixel electrode 3 spreads out with its perimeter overlapping the scanning lines 1 on opposite sides and the signal lines 2 on the remaining opposite sides.

Next, using FIGS. 3A–3D, a method of producing the liquid crystal display device according to the first embodiment will be described focusing on the production method of the drive substrate, in particular, a process from the formation of wiring lines to the formation of pixel electrodes.

Figure 3A:
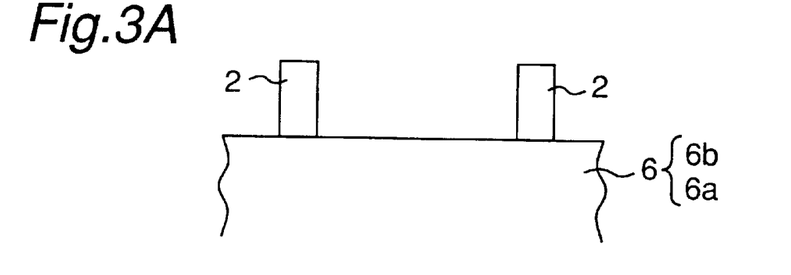
FIGS. 3A, 3B, 3C, and 3D are a flowchart showing a production method of the liquid crystal display device shown in FIG. 1, FIG. 3D being a cross-sectional view taken on line 3D—3D of FIG. 1.

First, as shown in FIG. 3A, signal lines 2 are formed of an aluminum-based metallic material and the like in a film thickness of several thousand angstrom on a substrate 6 consisting of an insulating substrate 6a and under layers 6b. The term "under layers 6b" here comprehensively expresses various films and patterns formed between the signal lines and the insulating substrate. Thus, the under layers 6b include not only the TFTs but also the scanning lines 1, the insulating film patterns 4 formed between the scanning lines, and the upper insulating film 5 on these scanning lines 1 and the insulating film patterns 4. The scanning lines 1 are formed in the same manner as the above-described manner of forming the signal lines 2. Also, the insulating film patterns 4 between the scanning lines 1, and the upper insulating film 5 on the scanning lines and the insulating film patterns are formed in the same manner as the manner of forming the insulating film patterns 4 between the signal lines 2, and the upper insulating film 5 on the signal lines and the insulating film patterns that will be described hereinafter. In this case, the upper insulating film on the scanning lines 1 functions as an interlayer insulation film between the scanning lines 1 and the signal lines 2. The insulating film patterns 4 between the scanning lines 1 may be omitted.

Figure 3B:
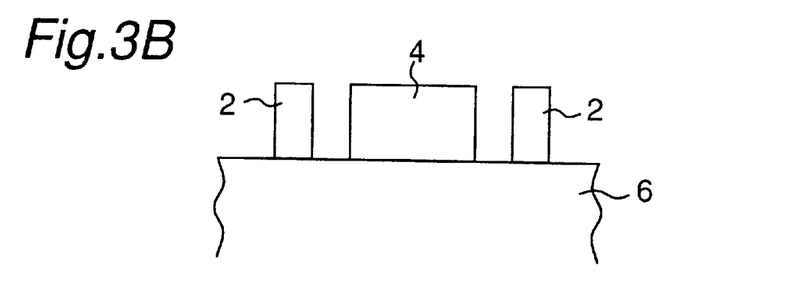

Next, an insulating film with a thickness corresponding to a level difference or unevenness that has taken place due to the signal lines (hereinafter simply referred to as "lines") 2 is formed and then subjected to patterning, whereby the insulating film pattern 4 (the insulating film before subjected to patterning is given the same reference number for convenience) is formed between the adjacent lines 2, as shown in FIG. 3B. When the liquid crystal display device is of a transmission type as in the present embodiment, the insulating film 4 is required to be a transparent film. It is also suitable that the insulating film 4 has a refractive index of about 1.4–1.95. As the insulating film 4, $SiN_x$, $SiO_x$ and the like can be mentioned, but an oxide film $SiO_2$ is herein used to give a film thickness of several thousand to several ten thousand angstrom that corresponds to the level difference. Then, the insulating film pattern 4 is formed through the steps of photolithography, etching, and removal of a resist. At this time, the configuration of the insulating film pattern 4 is such that only a space d from the pattern of the lines, the drain electrode and the like is secured.

Figure 3C:
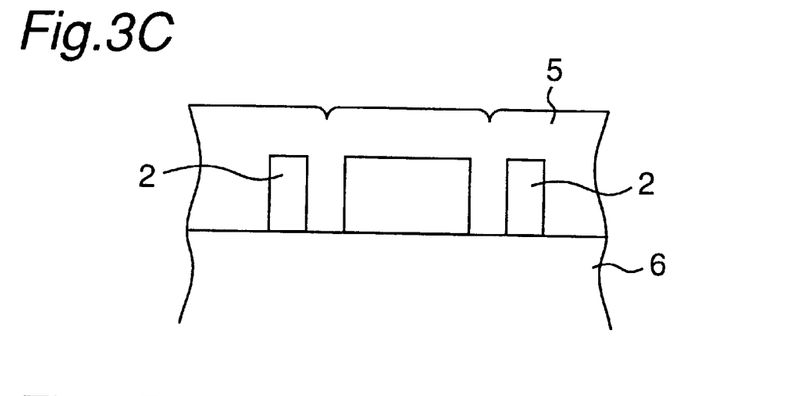
Figure 3D:
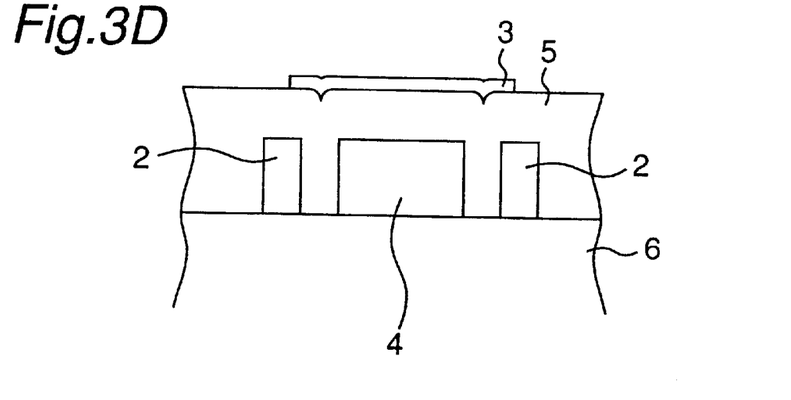
Figure 6:
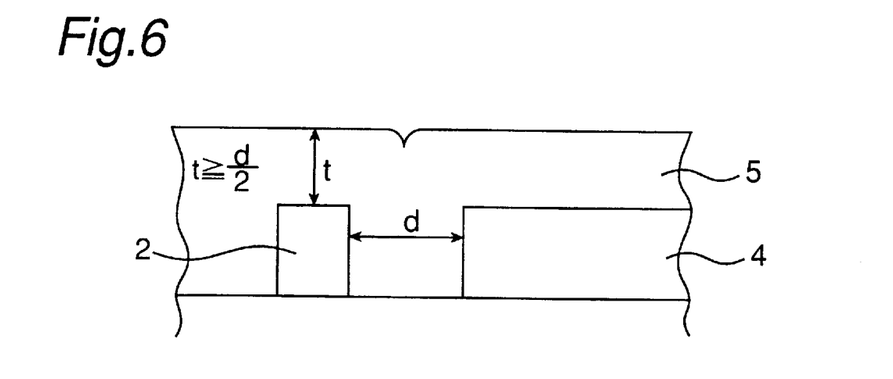
FIG. 6 is an illustration explaining a relationship between the space between an insulating film pattern and a line and the film thickness of an upper insulating film in the present invention.

After forming the insulating film pattern 4, the upper insulating film 5 is formed, as shown in FIG. 3C. The material of the upper insulating film 5 may be the same as, or different from that of the insulating film pattern 4. Herein, the same material is used. In this step, by controlling spaces between the lines 2 and the insulating film pattern 4, the flatness of the top surface of the upper insulating film 5 is controlled. For example, when the space d is too wide, a level difference arises in the upper insulating film 5 at a portion corresponding to the end portion of the lines 2, and thus the flatness is not improved. On the other hand, when the space d is too narrow, the space cannot be completely filled with the upper insulating film 5, and thus a hollow is produced at a portion of the space d. Because of such reasons, for example, a space width of about 0.95 μm is secured as the space d. A purpose of the upper insulating film 5 is to fill the space d at the time of the film formation to thereby planarize or flatten upper layers. Therefore, as schematically shown in FIG. 6, the film thickness t of the upper insulating film 5 at the time of the film formation is required to be at least half the size of the space d. For example, when the space d is about 0.95 μm, it is necessary to form an oxide film $SiO_2$ having a thickness of at least about 4750 Å. Actually, the upper insulating film 5 having a film thickness of about 15,000 Å, namely 1.5 μm is formed. In this way, the upper insulating film 5 is formed on the lines 2 and the insulating film pattern 4 to planarize the surface.

Next, using ITO (indium tin oxide), a transparent pixel electrode 3 is formed on the upper insulating film 5, with its perimeter overlapping the signal lines 2 on both sides and the scanning lines 1 (see FIG. 1), the scanning lines being not shown in FIGS. 3A–3D.

After this, using known methods, the application of an orientation film, rubbing treatment and the like are performed to complete the drive substrate. Then, the drive substrate and an opposed substrate are bonded to each other, and then liquid crystals are injected. Then, after required processes such as sealing and bonding of a polarizing plate, an active matrix type liquid crystal display device is completed.

Second Embodiment

Figure 4A:
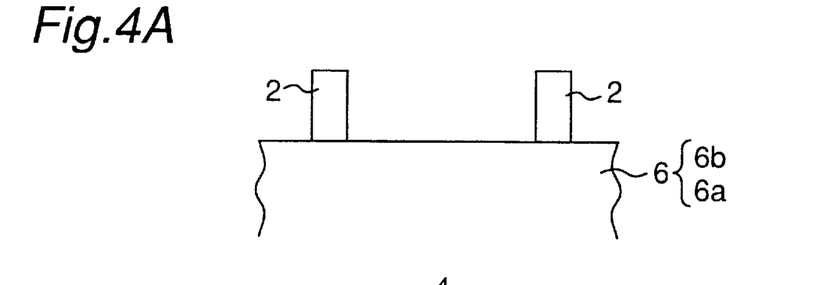
FIGS. 4A, 4B, 4C, 4D, and 4E are a flowchart showing a production method of a liquid crystal display device according to another embodiment of the present invention.
Figure 4B:
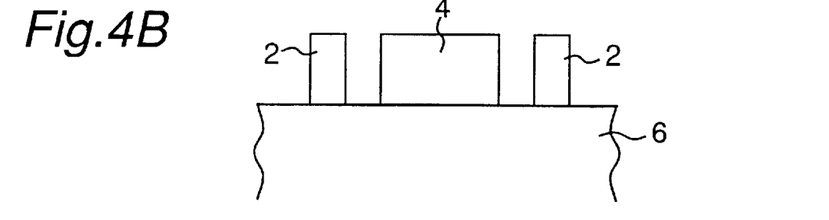
Figure 4C:
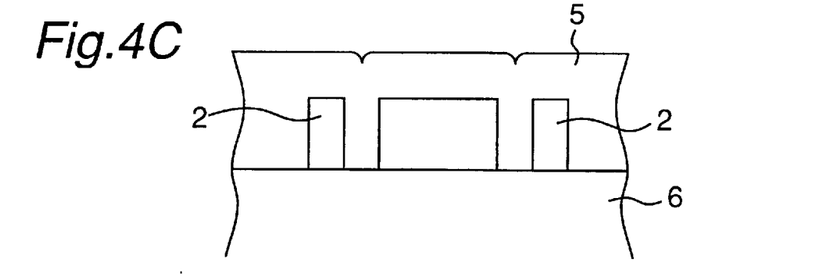

FIGS. 4A–4E show process steps for producing a drive substrate, in particular, from the formation of lines to the formation of a pixel electrode, among the process steps of producing a liquid crystal display device according to a second embodiment. Since the steps shown in FIGS. 4A–4C are the same as the steps shown in FIGS. 3A–3C, explanation of those steps is omitted. In FIGS. 4A–4E, portions that are identical or similar to those in FIGS. 1 and 3A–3D are given the same numerals as used in FIGS. 1 and 3A–3D.

Figure 4D:
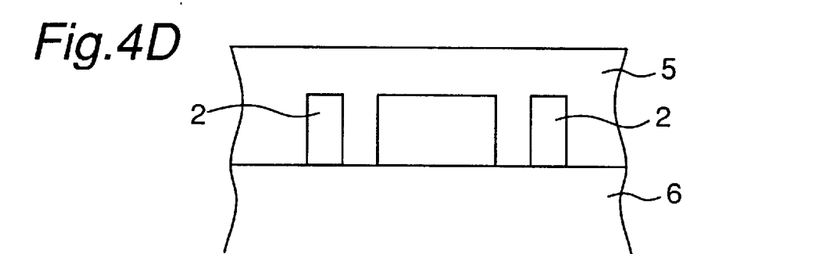

After forming the lines 2, the insulating film pattern 4, and the upper insulating film 5, the upper insulating film 5 is etched back as shown in FIG. 4D, whereby the upper insulating film 5 is thinned. For example, when the upper insulating film having a thickness of about 15,000 Å is formed, the film thickness of the upper insulating film is made about 7,000 Å by etching back the film by a thickness of about 8,000 Å.

Figure 4E:
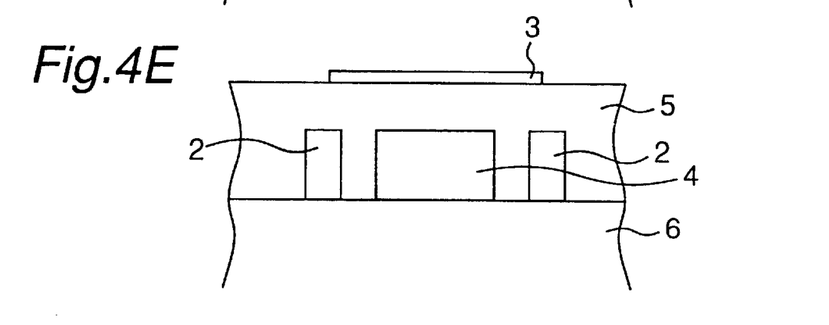

The upper insulating film 5 may be preferably thick for filling the space or gap d and for improvement in planarization. However, in the upper insulating film 5, it is necessary to form a minute contact hole for connecting the upper pixel electrode 3 to the source electrode. The thicker the upper insulating film 5, the more difficult it becomes to form and control minute patterns by means of etching. Further, the pixel electrode 3 has a film thickness of only about 1,000–1,500 Å when using ITO (indium tin oxide), for example. Considering the coverage by the thin film, i.e., the pixel electrode 3, it is preferable that the upper insulating film 5, in which the contact hole is formed, is not thick. Therefore, by etching back the whole surface of the upper insulating film 5 that is formed relatively thick, it is possible to control the upper insulating film 5 to a desired film thickness. Also, by carrying out etch-back, a little concave portion, which occurs in the upper insulating film 5 above the space d, is eliminated and the flatness is improved further. Accordingly, as shown in FIG. 4E, the flatness of the pixel electrode 3 per se, which is formed with its perimeter overlapping the signal lines 2 on both sides and the scanning lines 1 (not shown in FIGS. 4A–4E) is also improved, compared with the first embodiment.

Although not shown in the figures, the under layers 6b include the scanning lines 1, the insulating film patterns 4, and the upper insulating film 5. The insulating film patterns 4 may be omitted. The process steps after forming the pixel electrode 3 are as described in connection with the first embodiment.

Third Embodiment

Figure 2:
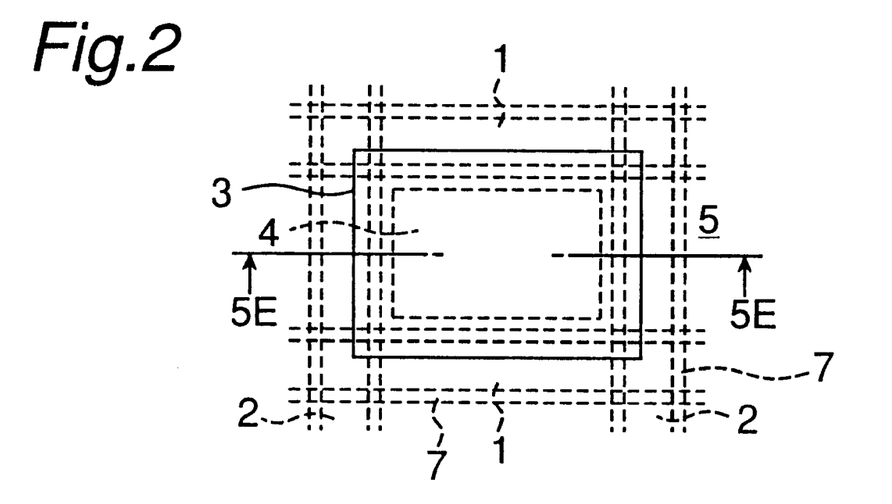
FIG. 2 is a simplified plan view of an essential part of a liquid crystal display device according to another embodiment of the present invention.

FIG. 2 is a simplified plan view of a drive substrate (only a portion of one pixel is shown) partially constituting part of a transmission type active matrix liquid crystal display device, which is a third embodiment of the present invention. FIGS. 5A–5E schematically show process steps of production of the drive substrate in FIG. 2. The present invention is characterized in that a pixel electrode-forming region is expanded by the planarization of regions in which wiring lines are formed and regions between those lines. In these figures, only those parts that are related to the invention are shown and thus those parts that are not directly related to the invention, such as liquid crystals and a switching element, are omitted in order to make the figures simple. In FIGS. 2 and 5A–5E, portions that are identical or similar to those in FIGS. 1 and 3A–3D are given the same reference numerals as used in FIGS. 1 and 3A–3D.

Figure 5A:
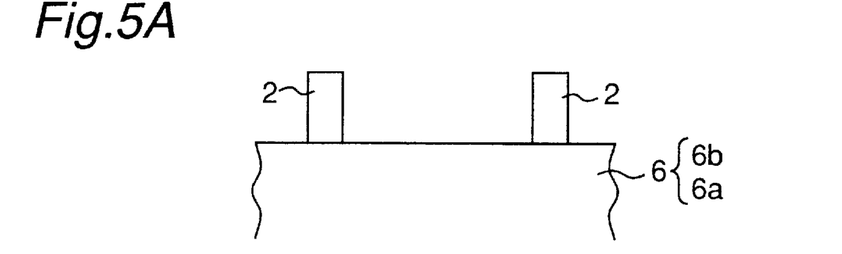
FIGS. 5A, 5B, 5C, 5D, and 5E are a flowchart showing a production method of the liquid crystal display device shown in FIG. 2, FIG. 5E being a cross-sectional view taken on line 5E—5E of FIG. 2.

The third embodiment defers from the first embodiment in that a lower insulating film 7 is formed between the insulating film pattern 4 and the substrate 6 (namely, under layers 6b), and on the lines 2 in the third embodiment. Using FIGS. 5A–5E, a method of producing the drive substrate of the liquid crystal display device shown in FIG. 2 will be described. Because the process step in FIG. 5A is the same as the process step shown in FIG. 3A of the first embodiment, the description on this step will be omitted.

Figure 5B:
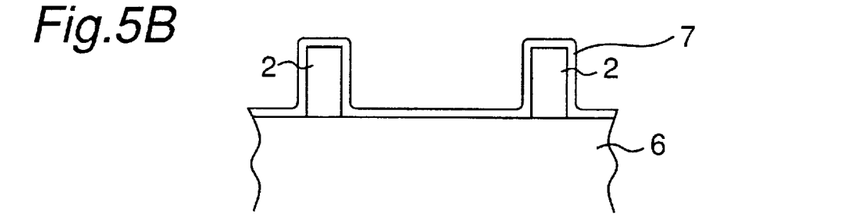
Figure 5C:
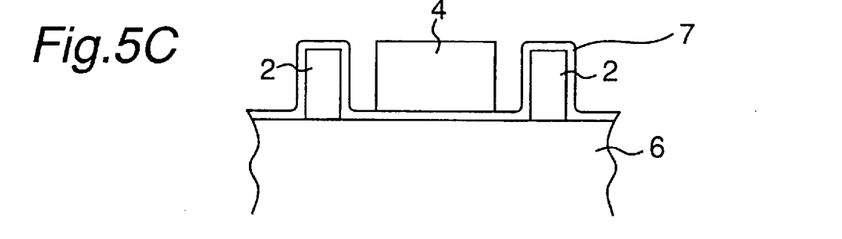
Figure 5D:
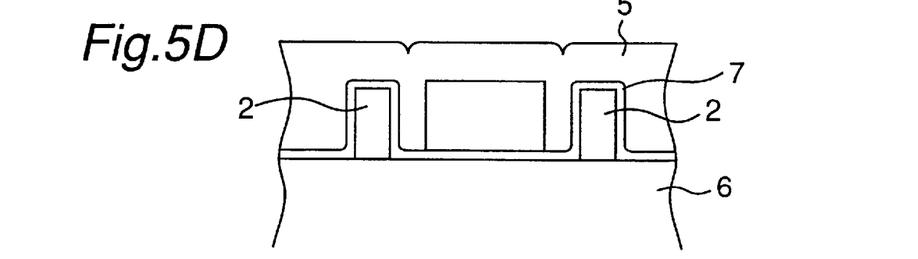
Figure 5E:
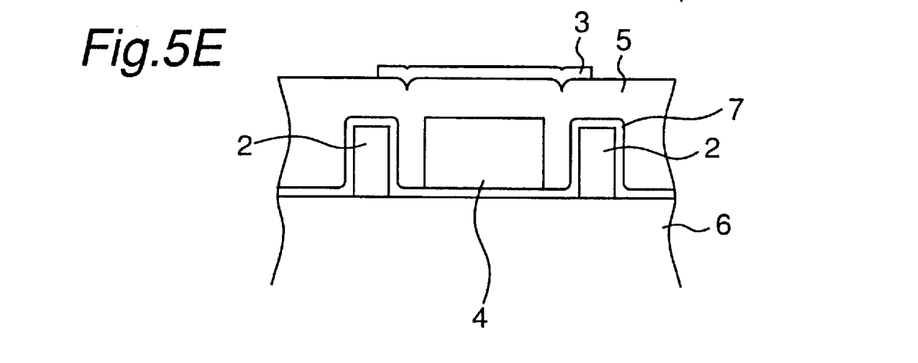

After forming the lines 2, the lower insulating film 7 is formed as shown in FIG. 5B. At this time, for example, an SiN film is used as the material for the upper insulating film 7, which is different than the materials for the upper insulating film 5 and the insulating film pattern 4 that are formed later. An SiN film having a thickness of about 2,200 Å is herein formed as the lower insulating film 7. After forming the lower insulating film 7, the formation of the insulating film pattern 4 made of an SiO$_2$ film, the formation of the upper insulating film 5 also made of an SiO$_2$ film, and the formation of the pixel electrode 3 are carried out as shown in FIGS. 5C, 5D, and 5E, respectively, through the processes similar to those shown in FIGS. 3B–3D. After the formation of the upper insulating film 5, the upper insulating film 5 may be etched back as in the second embodiment. By etching back the upper insulating film 5, a more planarized pixel electrode 3 is obtained. Although not shown in the figures, the under layers 6b of the substrate 6 include the scanning lines 1, the lower insulating film 7, and the insulating film pattern 4, which were formed in the same manner as in the steps shown in FIGS. 5A–5D, although the lower insulating film 7 and the insulating film pattern 4 may be omitted. The steps after the formation of the pixel electrode 3 are as described in connection with the first embodiment.

Figure 7A:
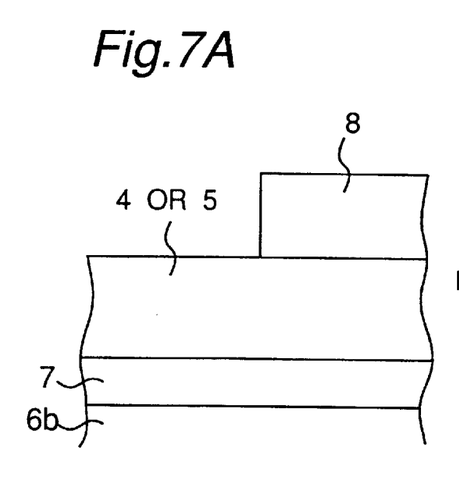
FIGS. 7A and 7B are illustrations explaining a reason why a lower insulating film is formed in the present invention.
Figure 7B:
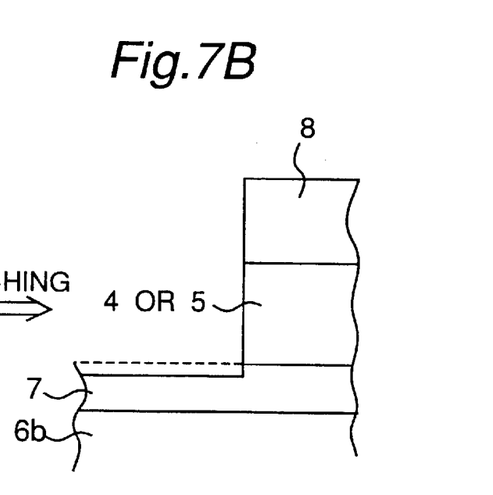

In the present embodiment, under the insulating film pattern 4 and the upper insulating film 5, the lower insulating film 7 made of a material different from these insulating films 4 and 5 is formed. Thus, it is possible for the insulating film 7 to have a function as an etching stopper when forming the insulating film pattern 4 on the lower insulating film 7, or etching the upper insulating film 5. As shown in FIGS. 7A and 7B, it is possible to prevent the insulating film pattern 4 or the upper insulating film 5 from being etched down to the lower layer portion 6b of the substrate 6. In FIGS. 7A and 7B, the reference numeral 8 indicates a photoresist for etching.

The present invention has been described using the three embodiments. However, it should not be construed that the present invention is limited to these, and various modifications may be made.

For example, although the transmission type active matrix display device has been described in each embodiment, the display device may be of a reflection type. In the case of the reflection type, the pixel electrode 3 is not transparent, but may be formed from aluminum and the like. Further, it is not necessary that the insulating films 4, 5 are transparent films. In any event, the present invention relates to the enlargement of the pixel electrode-forming region by planarizing regions in which wiring lines are formed and regions between those lines, and it will be easily understood that the present invention is applicable to any type of the liquid crystal display device.

Further, in the above embodiments, the pixel electrode 3 is formed into an approximately rectangular shape, but it may be formed into a shape of a rectangle from which a portion is cut off. Furthermore, each pixel electrode 3 is formed with its perimeter overlapping both of the adjacent two scanning lines and the adjacent two signal lines, however, it may be formed with its perimeter overlapping either the adjacent two scanning lines 1 or the adjacent two signal lines 2.

Further, in the above embodiments, the scanning lines 1 are formed on a lower side, and the signal lines 2 are formed on an upper side, but they may be formed reversely.

Also, in the above embodiments, the process steps shown in FIGS. 3A–3D, 4A–4E, or 5A–5E are conducted not only on the signal lines 2 on the upper side, but also on the scanning lines 1 on the lower side as well. That is, the same process steps are carried out for the scanning lines 1 and the signal lines. However, concerning the scanning lines 1, the process steps, shown in any one of FIGS. 3, 4, and 5, which are different than those for the signal lines, may be carried out.

Further, in the above embodiments, the insulating film pattern 4 is formed between the scanning lines 1, and also between the signal lines, but it may be formed only between the scanning lines 1 or between the signal lines 2.

Furthermore, a switching element other than a TFT may be used.

As is apparent from the above description, according to the present invention, the whole region on the lines and between the lines has smoothness and flatness, and a pixel electrode is formed on the planarized region. As a result, obstructions attributed to level difference, or unevenness, in the rubbing treatment for conducting the orientation of the liquid crystals are reduced. Thus, the deterioration in quality of the display such as poor orientation is prevented. Further, the flatness on the lines and between the lines continues, and the lines are also covered with the upper insulating film. Therefore, it becomes possible to form a pixel electrode on an upper layer of the lines. Thus, the pixel electrode can be formed in a wider range, and an improvement in numerical aperture can also be achieved. Furthermore, it is presumed that, with the progress of high definition of the device in future, the reduction in resistance of the conductive lines for wiring is required, and thus that, for example, the increase in film thickness of the conductive lines and the like will be advanced. Concerning the control of the film thickness against a large level difference or a small level difference, it is possible to easily cope with various film thicknesses only by controlling the film thickness when forming insulating film patterns. As described above, according to the present invention, it becomes possible to provide a high-definition active matrix liquid crystal display device having good quality in display and a high numerical aperture.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An active matrix type liquid crystal display device in which a plurality of scanning lines and a plurality of signal lines are arrayed on an insulating substrate comprising:

a plurality of insulating film patterns each formed between adjacent scanning lines and/or between adjacent signal lines so that the insulating film patterns do not contact either of the scanning lines or the signal lines;

an upper insulating film formed on the insulating film patterns and the lines between which the respective insulating film patterns are formed, and in spaces between the insulating film patterns and the lines, said upper insulating film having a continuous top surface at a same or approximately same level;

wherein the insulating film patterns comprise an oxide or nitride; and pixel electrodes formed on the upper insulating film.

2. The liquid crystal display device according to claim 1, wherein each insulating film pattern is formed from a transparent film having a refractive index of 1.4–1.95.

3. An active matrix type liquid crystal display device in which a plurality of scanning lines and a plurality of signal lines are arrayed on an insulating substrate, comprising:

insulating film patterns each formed between adjacent scanning lines and/or between adjacent signal lines;

an upper insulating film formed on the insulating film patterns and the lines between which the respective insulating film patterns are formed, and in spaces between the insulating film patterns and the lines, said upper insulating film having a continuous top surface at a same or approximately same level;

pixel electrodes formed on the upper insulating film; and wherein said upper insulating film has a thickness that is ½ or more of the space between one of the insulating film patterns and the line adjacent to the insulating film pattern.

4. An active matrix type liquid crystal display device in which a plurality of scanning lines and a plurality of signal lines are arrayed on an insulating substrate, comprising:

insulating film patterns each formed between adjacent scanning lines and/or between adjacent signal lines;

an upper insulating film formed on the insulating film patterns and the lines between which the respective insulating film patterns are formed, and in spaces between the insulating film patterns and the lines, said upper insulating film having a continuous top surface at a same or approximately same level, wherein the insulating film patterns comprise an oxide or nitride of silicon;

pixel electrodes formed on the upper insulating film; and a lower insulating film located between the insulating film patterns and the insulating substrate and on the lines, said lower insulating film being made of a material different from materials of the insulating film patterns and the upper insulating film.

5. A method of producing an active-matrix liquid crystal display device in which a plurality of scanning lines and a plurality of signal lines are arrayed on an insulating substrate in such directions that the scanning lines and the signal lines intersect each other, comprising:

forming an insulating film pattern between adjacent scanning lines and/or adjacent signal lines so that the insulating film pattern does not contact either of the scanning lines or the signal lines, wherein the insulating film patterns are not color filters; and forming an upper insulating film on the insulating film pattern and the lines and in spaces between the insulating film pattern and the lines in such a manner that the upper insulating film has a continuous top surface at a same or approximately same level.

6. The method according to claim 5, further comprising thinning the upper insulating film by an etch-back method after forming the upper insulating film.

7. A method of producing an active-matrix liquid crystal display device in which a plurality of scanning lines and a plurality of signal lines are arrayed on an insulating substrate in such directions that the scanning lines and the signal lines intersect each other, comprising:

forming an insulating film pattern between adjacent scanning lines and/or adjacent signal lines, the insulating film patterns comprising an oxide or a nitride;

forming an upper insulating film on the insulating film pattern and the lines and in spaces between the insulating film pattern and the lines in such a manner that the upper insulating film has a continuous top surface at a same or approximately same level; and before forming the insulating film pattern, forming a lower insulating film of a material different from materials of the insulating film pattern and the upper insulating film.

8. A method of producing an active-matrix liquid crystal display device in which a plurality of scanning lines and a plurality of signal lines are arrayed on an insulating substrate in such directions that the scanning lines and the signal lines intersect each other, comprising:

forming an insulating film pattern between adjacent scanning lines and/or adjacent signal lines;

forming an upper insulating film on the insulating film pattern and the lines and in spaces between the insulating film pattern and the lines in such a manner that the upper insulating film has a continuous top surface at a same or approximately same level; and wherein said upper insulating film has a thickness that is ½ or more of a space between the insulating film pattern and the line that is adjacent to the insulating film pattern.

* * * * *